(12) United States Patent
Rydnell et al.

(10) Patent No.: US 8,724,585 B2
(45) Date of Patent: May 13, 2014

(54) GRE USER-PLANE

(75) Inventors: Gunnar Rydnell, Västra Frölunda (SE); Hans Bertil Rönneke, Kungsbacka (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 240 days.

(21) Appl. No.: 13/140,946

(22) PCT Filed: Dec. 19, 2008

(86) PCT No.: PCT/EP2008/068059
§ 371 (c)(1),
(2), (4) Date: Jun. 20, 2011

(87) PCT Pub. No.: WO2010/069402
PCT Pub. Date: Jun. 24, 2010

(65) Prior Publication Data
US 2011/0255510 A1   Oct. 20, 2011

(51) Int. Cl.
*H04L 12/28* (2006.01)
*H04L 12/56* (2011.01)
*H04W 4/00* (2009.01)

(52) U.S. Cl.
USPC ............ 370/331; 370/328; 370/338; 455/432

(58) Field of Classification Search
USPC ................. 370/338–353, 401–474, 326–332; 455/435–458; 709/221–229
See application file for complete search history.

(56) References Cited

U.S. PATENT DOCUMENTS

| | | | | |
|---|---|---|---|---|
| 7,039,404 | B2 * | 5/2006 | Das et al. | 455/435.1 |
| 7,593,406 | B2 * | 9/2009 | Joung | 370/392 |
| 8,086,855 | B2 * | 12/2011 | Katz et al. | 713/170 |
| 8,144,728 | B2 * | 3/2012 | Ahmavaara | 370/466 |
| 8,315,227 | B2 * | 11/2012 | Rydnell et al. | 370/331 |
| 2003/0117983 | A1 * | 6/2003 | Ton et al. | 370/338 |
| 2004/0203765 | A1 | 10/2004 | Das | |
| 2006/0050667 | A1 * | 3/2006 | Verma et al. | 370/338 |
| 2008/0214189 | A1 * | 9/2008 | Taaghol | 455/432.2 |
| 2009/0047947 | A1 * | 2/2009 | Giaretta et al. | 455/432.1 |
| 2011/0075675 | A1 * | 3/2011 | Koodli et al. | 370/401 |
| 2011/0103310 | A1 * | 5/2011 | Stojanovski et al. | 370/328 |
| 2012/0202496 | A1 * | 8/2012 | Okabe et al. | 455/435.1 |

FOREIGN PATENT DOCUMENTS

WO   WO 2007/038947 A1   4/2007

* cited by examiner

*Primary Examiner* — Man Phan

(57) ABSTRACT

The present invention relates to providing a generic control plane in a GTP mobility protocol in a core network. When a type of user plane is detected, a user plane parameter is provided in a control plane message header. The user plane message indicates the type of user plane. Functions, parameters and messages are provided according to the indicated type of user plane. Thus, e.g. easier hand over between different access networks can be provided and an optimization of the user plane implementation in an edge node.

10 Claims, 10 Drawing Sheets

| Octets | Bits 8 | 7 | 6 | 5 | 4 | 3 | 2 | 1 |
|---|---|---|---|---|---|---|---|---|
| 1 | Version | | | FFS | T | E | S | FFS |
| 2 | Message Type ||||||||
| 3 | Message Length (1st Octet) ||||||||
| 4 | Message Length (2nd Octet) ||||||||
| 5 - n | These octets are present in the header if either of the T, S or E flags is set to '1'. ||||||||

Fig. 6

| Octets | Bits | | | | | | |
|---|---|---|---|---|---|---|---|
| | 8 | 7 | 6 | 5 | 4 | 3 | 2 | 1 |
| 1 | Version | | | UPF | T | E | S | FFS |
| 2 | Message Type |
| 3 | Message Length (1st Octet) |
| 4 | Message Length (2nd Octet) |
| 5 - n | These octets are present in the header if either of the T, S or E flags is set to '1'. |

Fig. 7

GRE USER-PLANE

TECHNICAL FIELD

The present invention relates to user plane and control plane, and more specifically the invention relates to providing a more generic control plane supporting both GTP-U user plane and GRE based user plane.

BACKGROUND

In 3GPP Rel 8, LTE/EPC is standardized. The system includes 3GPP (3$^{rd}$ Generation Partnership Project) as well as non-3GPP system access. In the core network the proxy mobile IP (PMIP) protocol as well as the GTP-C protocol (GPRS Tunneling Protocol-Control) can be used as mobility control protocol. When PMIP is used, basic IP connectivity is provided in the core network between the Packet Gateway (PGW) and the user equipment by Generic Routing Encapsulation (GRE) tunneling specified in IETF. When GTP-C is used for control, GPRS Tunneling Protocol-User (GTP-U) is used as user plane for tunneling of user data in the Evolved Packet Core (EPC). Compared to the GTP mobility protocol, the PMIP protocol provides simpler and more limited functionality. In particular, the bearer handling is simplified.

The system architecture of an existing solution is shown in FIG. 1, where a user equipment 3 is connected to a Evolved Universal Terrestrial Radio Access Network (EUTRAN) 4. The system has a Mobility Management Entity (MME) providing control-plane functionality and giving orders to the Signaling Gateway (SGW). A Home Subscriber Server (HSS) is connected to the MME and describes the many database functions in the network. The Packet Data Network Gateway (PGW) 13 provides connectivity between the user equipment 3 and external networks. The Policy and Charging Rules Function (PCRF) 6 is connected between the PGW 13 and an operator's IP services 8, such as IMS, PSS etc. and takes care of policy and charging issues between the user equipment 3 and the operator. In the existing solution the core network (CN) interfaces S5/S8 can be PMIP or GTP based. The S2 interfaces are PMIP based. The PMIP based interfaces are marked with dashed lines in FIG. 1. The serving gateway (SGW) 12 or the non-3GPP access system 7 acts as an (Mobile Access Gateway) MAG, while the PGW 13 act as the local mobile anchor (LMA) using PMIP terminology.

When PMIP 16 is used, basic IP connectivity is provided in the core network between the PGW and the SGW/access network by GRE 17 tunnelling specified in IETF. When GTP-C 14 is used for control, GTP-U 15 is used as user plane for tunnelling of user data in the EPC. Recently in 3GPP, the GTP specification has been split into two specifications—one for GTP Control plane (3GPP TS 29.274) and one for GTP User plane (3GPP TS 29.281). The situation for PMIP 16 based interfaces is that the control plane is specified in 3GPP TS 29.275 and in IETF RFC 5213, while the user plane is specified in IETF Draft, "GRE Key Option for Proxy Mobile IPv6", draft-muhanna-netlmm-grekey-option-02, work in progress, as shown in FIG. 2.

With the latest developments in 3GPP and in IETF, the GRE user plane (as well as PMIP) is getting more and more aligned to GTP, and their functions are now quite similar. The differences between GRE user plane and GTP-U are illustrated in table 1 below. The differences are in Quality of Service (QoS) and bearer handling, as well as for transport IP addressing for user plane and control plane.

TABLE 1

|  | GTP-U | GRE user plane | Comment |
| --- | --- | --- | --- |
| Tunnel id | TEID (32 bit) | GRE Key (32 bit) | Same |
| Erroneous user packets | Err ind | U-NERP | Same |
| Path Management | Echo | Echo | Same |
| Node Failure | Restart Counter | Restart Counter | Same |
| IP addressing | Separate IP address for U-plane and C-Plane | The same IP address for U-plane and C-Plane | Different |
| QoS | Default and dedicated bearers | Only one bearer per end user IP address | Different |

With the tight coupling of control and user plane in the existing solutions there may be problems when doing hand over (HO) between PMIP and GTP based interfaces. A mapping between different parameters is needed. When the user equipment changes from GTP based interface to PMIP based interface there needs e.g. to be a mapping between Tunnel Endpoint Identifier (TEID) and GRE keys for optimized hand over. It is also a need for a selection mechanism for handling the dedicated bearers and the default bearer (GTP-U) which can not be handled in the GRE tunneling network.

There is also a product problem with the known solutions of supporting multiple user planes.

SUMMARY

Thus it is an objective of this invention is to propose a mechanism for how a more flexible implementation and use of combinations of user plane and control plane can be done. Since the GRE and GTP U-Planes are now so similar and also with the decoupling of the GTP user- and control-planes it is possible to make small modifications in GTP-C such that GTP-C can be a more generic control plane supporting both GTP-U user plane and GRE based user plane.

The objectives set forth above are achieved by providing, in a first aspect of the present invention, a method in a core network node providing a generic control plane in a GTP mobility protocol. The method comprises the following steps:
  detecting a type of user plane,
  providing a user plane parameter in a control plane message, the user plane parameter indicating the type of user plane,
  providing user plane functions, parameters and messages according to the indicated type of user plane to another node in the control plane message.

In an alternative embodiment of the method according to the present invention the user plane parameter is located in the header of the control plane message.

In an alternative embodiment of the method according to the present invention the user plane parameter is a user plane flag, UPF, UPF=0 indicates GTP-U and UPF=1 indicates GRE u-plane.

In yet an alternative embodiment of the method according to the present invention the control plane message header is a GTP-C header.

In an alternative embodiment of the method according to the present invention the user plane parameter is located in the body of the control message.

In still an alternative embodiment of the method according to the present invention the user plane parameter is located in an information element.

In an alternative embodiment of the method according to the invention the method comprises the additional step of providing a "Version not supported"-message indicating to a peer node the type of user plane that is supported by the node.

In yet an alternative embodiment of the method according to the present invention a TEID parameter is interpreted as a TEID in case of GTP-U and as a GRE key in case of GRE based u-plane.

In a further alternative embodiment of the method according to the present invention a user plane is selected on the basis of the user equipment and a packet data gateway network node, PGW node, handles GTP-U and GRE u-plane when a user equipment connected to the PGW-node moves between non-3GPP and 3GPP access.

In yet an alternative embodiment of the method according to the invention a PGW node is dedicated for user equipment that does not have need for additional GTP-U features.

In still an alternative embodiment of the method according to the present invention the user equipment are mobile broadband users.

In a second aspect of the present invention there is provided a communication node arranged to provide a generic control plane in a GTP mobility protocol in a core network, said node comprising a processor, a memory and a communication interface and said wherein the node is arranged to
  detect a type of user plane,
  provide a user plane parameter in a control plane message header, the user plane parameter indicating the type of user plane, and to
  provide functions, parameters and messages according to the indicated type of user plane.

BRIEF DESCRIPTION OF THE DRAWINGS

The invention will now be further described in more detail in the following detailed description by reference to the appended drawings in which
FIG. 6 shows the GTP-C Header according to 29.274 v1.2.0.
FIG. 7 shows the proposed new GTP-C Header.

DETAILED DESCRIPTION

Figure 4:
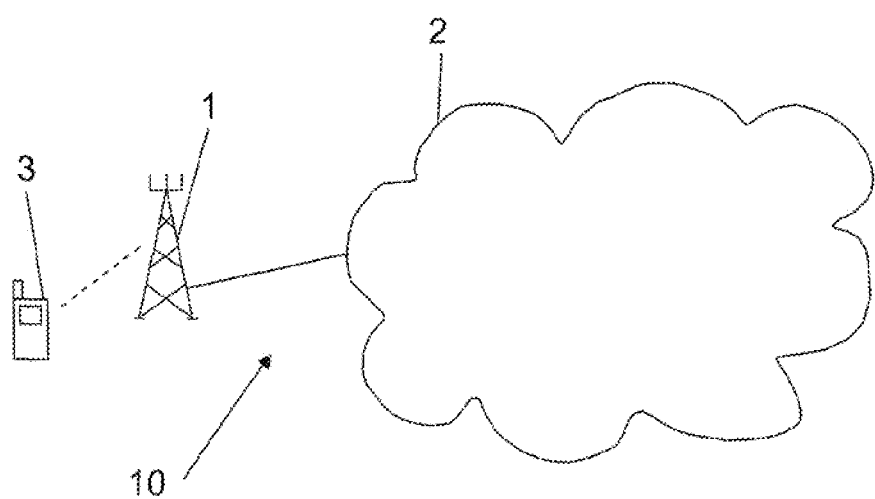
FIG. 4 illustrates schematically an embodiment of a network system according to the present invention.

FIG. 4 shows a network 10 according to the present invention. The network 10 comprises at least one base station/node device 1 or similar wireless access gateway (e.g. access point) to an infrastructure communication network 2. The base station 1 is arranged to wirelessly communicate with user equipment 3 (UE) through network connections. The base station 1 may comprise one or more antennas.

Figure 5:
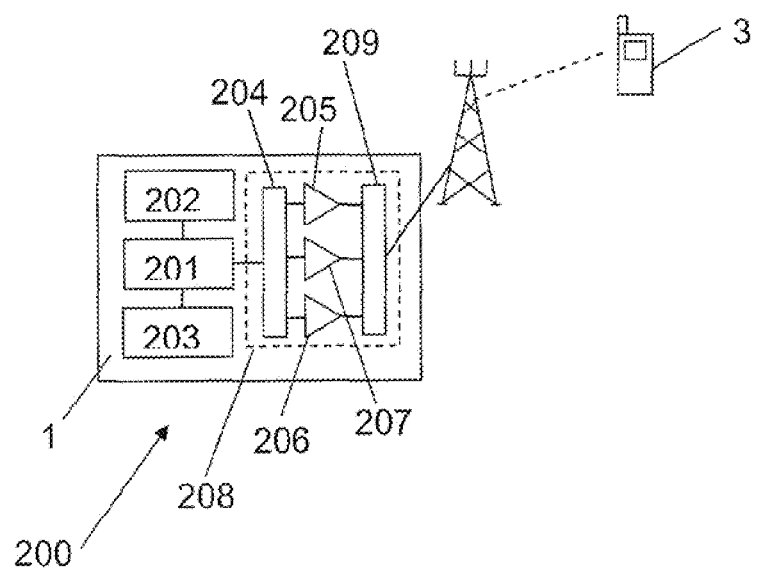
FIG. 5 illustrates a node implementing the present invention.

In FIG. 5 a node device 1 (e.g. a base station) implementing the solution according to the present invention is shown. The node 1 may comprise at least one processing unit 201, at least one memory unit 202, and at least one communication interface 203. Furthermore, the device comprises a transceiver portion 208 for receiving and transmitting radio signals. The transceiver portion may comprise AD/DA unit(s) 204, at least one power amplifier 205, 206, 207, and optionally a switch/multiplexer 209. The processing unit 201 is arranged to run code for communication control and data traffic. It may further be arranged to determine which antennas to use in a MIMO communication configuration. The processing unit 201 may comprise for instance a microprocessor, a Digital Signal Processor (DSP), an ASIC (application Specific Integrated Circuit), or an FPGA (Field programmable gate array) or a combination of these. The memory unit 202 may comprise any suitable type of memory (volatile and/or non-volatile) such as e.g. RAM, ROM, EEPROM, Flash, and hard disk. The communication interface 203 connects the node 1 to the infrastructure network 2. It should be understood by the skilled person that other communication equipment may be present as well depending on the type of wireless communication protocol/standard used. It should be noted that the transceiver portion 208 may be configured in different ways depending on radio technology and/or communication protocol used as understood by the skilled person.

Figure 1:
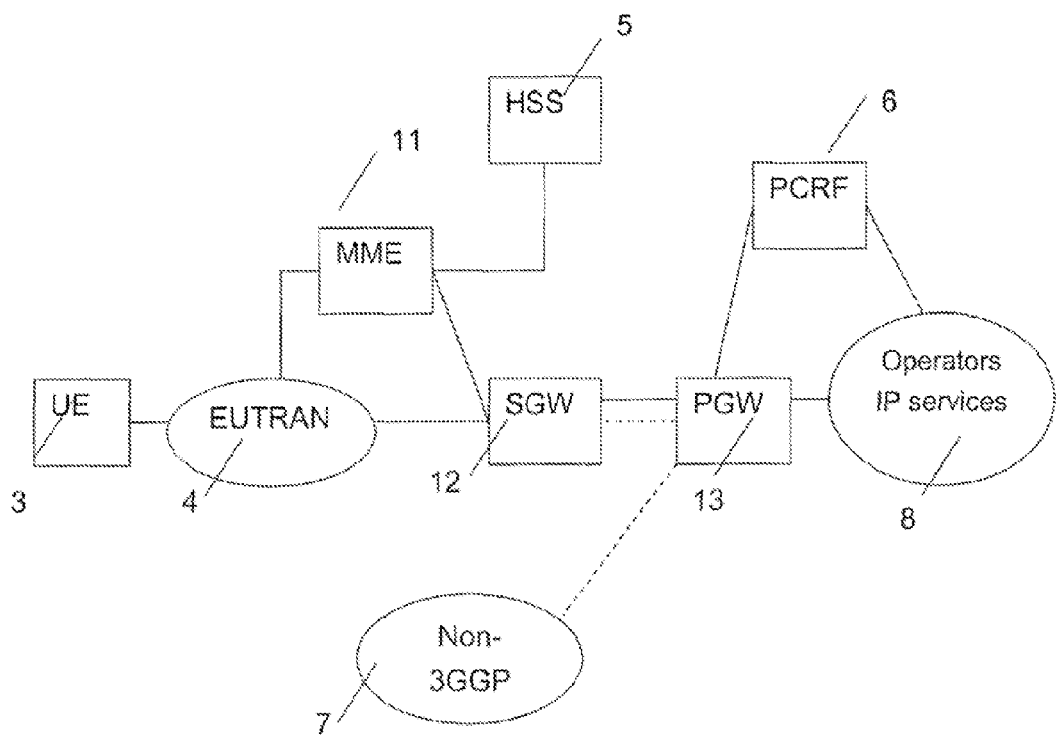
FIG. 1 illustrates an existing solution.
Figure 2:
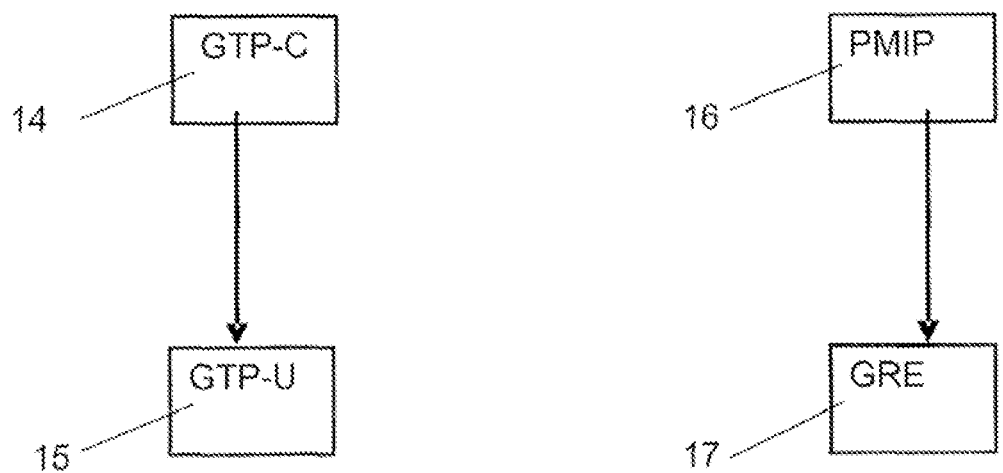
FIG. 2 illustrates schematically the user plane for GTP and PMIP.
Figure 3:
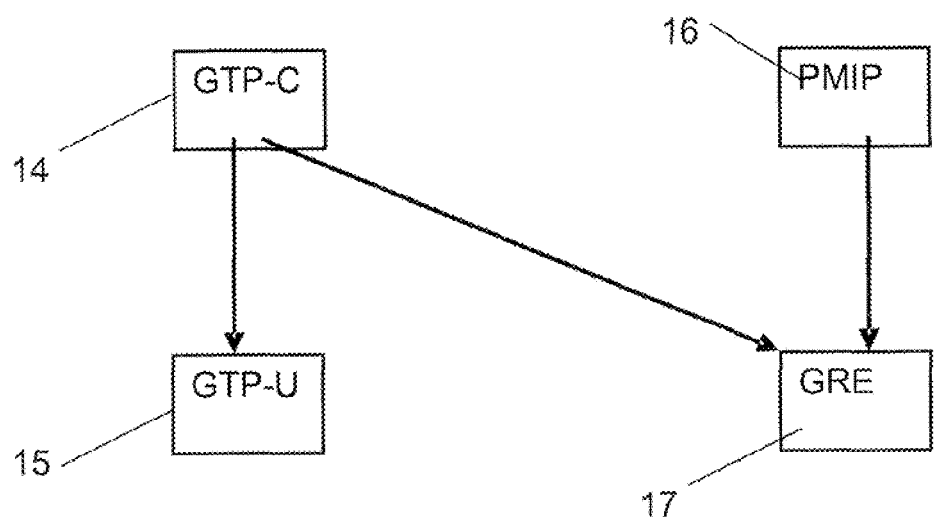
FIG. 3 illustrates the basic concept of the invention.

As the GRE user plane is getting more and more aligned to GTP, the similarities can be used to solve some of the problems with the prior art. The GTP-C could be modified with quite small changes to generically support both GRE user plane and GTP-U based user plane, as shown in FIG. 3. As mentioned above, the PMIP protocol provides simpler bearer handling compared to the GTP protocol. However, the PMIP has more limited functionality than GTP. Thus it is simple to limit the GTP functionality and "turn it" into PMIP in applicable cases. Going the other way, i.e. modifying the PMIP instead of the GTP, would imply adding all the missing functions to the PMIP and then effectively turn PMIP into GTP, which will be more complicated.

Some kind of indication could be used in the GTP-C messages to indicate the nature of the user plane. When GTP-U is used by GTP-C, the full plethora of functions and messages are valid, while if the user plane used is GRE tunneling, a restricted amount of options in GTP-C are valid. E.g. with GRE user plane it shall not be allowed to use any of the Dedicated bearer procedures, neither will the "IP address for User Plane" parameter be valid, since the "IP address for User Plane" will be the same as the "IP address for control plane". However, many other parameters will be valid, e.g. the Tunnel Endpoint Identifier (TEID) for user plane can be used as it is used for the GRE Key. The GRE key and the TEID is handled in the same way, uplink and downlink, and they even have the same 32 bit formats. The same TEID parameter can thus be interpreted as a TEID in case of GTP-U and as a GRE key in case of GRE based user plane.

GTP-C needs a way to indicate what type of user plane that is used. The present invention proposes two different ways of signalling the type of user plane. One possible way is to use provide a specific user plane adapted parameter in an information element (IEs) in the control messages body.

Figure 8:
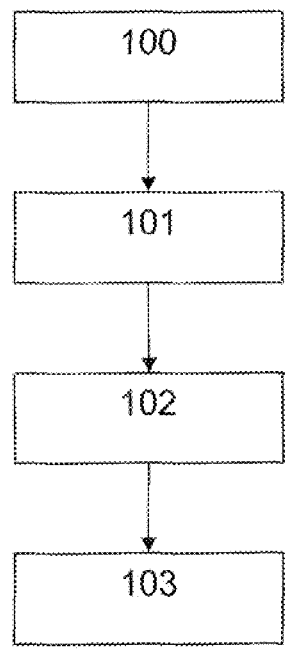
FIG. 8 illustrates a method according to the present invention.
Figure 9:
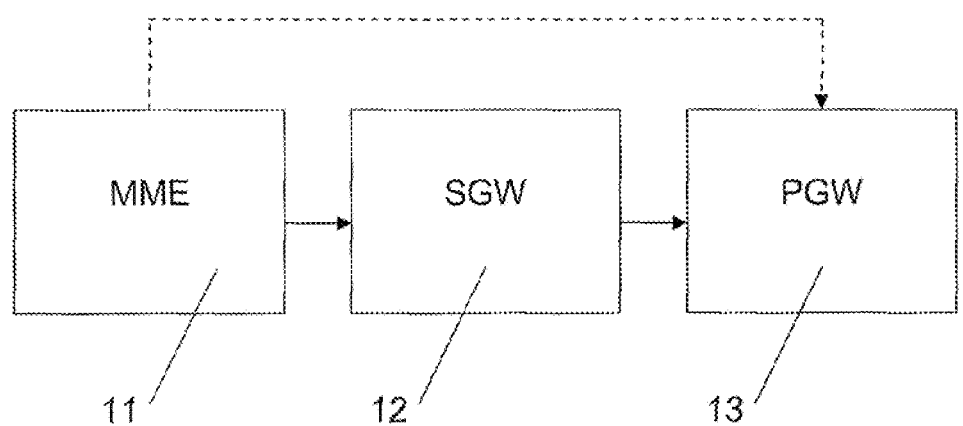
FIG. 9 illustrates two different ways of signalling.

Another way is to use a flag in the header of the control message, i.e. the GTP-C header, to indicate the type of user plane. This parameter can be placed in a free bit in the header. FIG. 6 shows that bit 5 in octet 1 in the GTPv2 Header is free. However, as of today, the use of all bits is not decided in 3GPP for GTPv2, so the parameter can be placed in any free bit in the header. The free bit can be used as a U-plane Flag, (UPF), where the value 0 indicates GTP-User Plane and the value 1 indicates the GRE U-plane:
  UPF=0→GTP-U
  UPF=1→GRE u-plane Depending on the value of the UPF the following information elements in the GTPv2 Header and the included parameters are interpreted differently. FIG. 7 shows the GTP-C header according to the present invention with the UPF flag. This makes it necessary to implement GTP in the nodes. In addition, it is necessary to implement only one user plane, as the UPF indicates the type of user plane, GTP-U or GRE u-plane. This is a simplification compared to the prior art which requires implementation of two types of user planes. First, the type of user plane is detected 100, then the serving gateway (SGW) 12 receives an order 101 from the Mobility Management Entity (MME) 11, as shown in FIG. 8. The SGW 11 provides the user plane parameter 102 in the control message (in the body or in the header) and provides functions, parameters and messages 103 according to the indicated type of user plane according to the received order. This signaling is sent to the packet data network gateway (PGW) 13, and the PGW 13 starts a default PDN connection. In this case, the user plane does not go through the MME 10, but in another case the MME 10 could be the unit receiving the signals and starting the default PDN connection. These two alternatives are illustrated in FIG. 9. The case where the MME 10 sends an order to the SGW 11 is illustrated with straight lines and the other case is shown with a dashed line.

Figure 10:
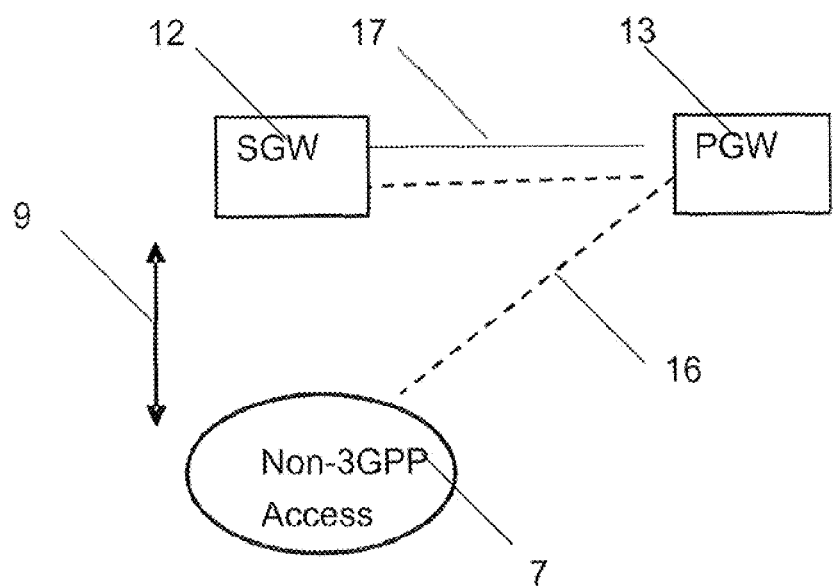
FIG. 10 illustrates hand over between a PMIP based interface and a GTP based interface.

One simplification would be possible for hand over 9 between PMIP based interface and GTP based interface. E.g. hand over 9 between non-3GPP 7 PMIP based access and GTP based access. PMIP with GRE u-plane 19 is used between the non-3GGP access 7 and the PGW 13, and GTP-C with GRE u-plane 20 is used between the SGW 12 and the PGW 13. Thus, no mapping of user plane parameters is needed in this case, as seen in FIG. 10.

It would be useful for a node to know which user plane its peer's supports, by providing online user plane type negotiation. This can be provided by using the "Version not supported"-message which contains only the GTP header and indicates the latest GTP version that the GTP entity on the identified UDP/IP address can support. The same logic can be used to indicate which type of user plane that is supported. If a node receives a GTP-C message with the UPF flag set to a value that is not supported, the node shall send a "Version not supported"-message to the peer, with the UPF set to the value that is supported.

The use of GRE user plane for GTP-C can be used in different ways. One possible scenario where the use of GRE user plane for GTP-C is an advantage is to simplify the handover between non-3GPP and 3GPP accesses. When a user equipment connected to a PGW moves between non-3GPP and 3GPP accesses, there is a need for a solution on how to handle the transition between non-3GPP having dedicated bearers and 3GPP not having dedicated bearers. The solution would be to implement the present invention by having one user plane because then there is no need for dedicated bearers. A user equipment specific selection of user plane would be needed and the PGW node should be equipped to handle both GTP-U and GRE user planes, by implementing the present invention.

A second possible scenario for the use of the present invention is in the case of optimizing the user plane implementation in an edge node i.e. PGW. In this case, the PGW node should only handle GRE user plane. This may be achieved for example by dedicating this PGW for certain use equipment that doesn't have any need for the additional GTP-U features, e.g. mobile broadband users. Also in this scenario, the node only needs one implemented user plane, which is a simplification compared to the known solutions.

Summarized, the present invention provides easier hand over between different access networks by using the modified GTP-C which generically support both GRE user plane and GTP-based user plane. It also provides easier implementations based on one user plane, e.g. using standard routers for IETF based GRE user plane enhanced with GTP-C control plane features.

Although the invention has been described in detail for the purpose of illustration, it is to be understood that such detail is solely for that purpose and that variations can be made therein by those skilled in the art without departing from the spirit and scope of the invention except as it may be limited by the claims.

REFERENCE NUMERALS

1. Base station/node device
2. Communication network
3. User equipment
4. Eutran
5. HSS
6. PCRF
7. Non-3GPP Access
8. Operator's IP Services
9. Hand Over
10. Network
11. MME
12. SGW
13. PGW
14. GTP-C
15. GTP-U
16. PMIP
17. GRE
19. GTP-C with GRE U-plane
20. PMIP with GRE U-plane
201. Processing unit
202. Memory unit
203. Communication interface
204. AD/DA unit
205-207. Power amplifier
208. Transceiver
209. Switch/multiplexer

ABBREVIATIONS

BRI Binding Revocation Indication
BRA Binding Revocation Acknowledgement
CN Core Network
EPC Evolved Packet Core
EUTRAN Evolved Universal Terrestrial Radio Access Network
GRE Generic Routing Encapsulation
GTP-C GPRS Tunneling Protocol-Control
GTP-U GPRS Tunneling Protocol-User
HO Hand Over
IE Information Element
IETF Internet Engineering Task Force
IP Internet Protocol
LMA Local Mobility Anchor
LTE Long Term Evolution
MAG Mobile Access Gateway
PCRF Policy and Charging Rules Function
PGW Packet Data Network Gateway
PMIP Proxy Mobile IP
PBU Proxy Binding Update
PBA Proxy Binding Acknowledgement
PCRF Policy and Charging Rules Function PDNGW Packet Data Network Gateway
QoS Quality of Service
SAE System Architecture Evolution
SGW Signaling Gateway
TEID Tunnel Endpoint Identifier
UE User Equipment
3GPP 3de Generation Partnership Project

REFERENCES

3GPP TS 23.401
3GPP TS 23.274
3GPP TS 23.275

The invention claimed is:

1. A method in a core network node providing a generic control plane, referred to as GPRS Tunneling Protocol-Control (GTP-C), the generic control plane being in a GPRS Tunneling Protocol (GTP) mobility protocol, the GTP-C supporting both a GPRS Tunneling Protocol-User (GTP-U) user plane and a Generic Routing Encapsulation (GRE) based user plane, wherein the method comprises the following steps:
   detecting a type of user plane, the type of user plane being a GTP-U user plane or a GRE based user plane,
   providing a user plane parameter in a control plane message of the generic control plane, the user plane parameter indicating the type of user plane, and
   providing user plane functions, parameters and messages according to the indicated type of user plane to another node in the control plane message;
   wherein the generic control plane is configured to support both GTP-U and GRE based user planes;
   wherein the user plane parameter is located in a header of the control plane message; and
   wherein the user plane parameter is a user plane flag (UPF), wherein UPF=0 indicates the type of user plane is a GTP-U user plane and UPF=1 indicates the type of user plane is a GRE based user plane.

2. The method according to claim 1, wherein the control plane message header is a GTP-C header.

3. The method according to claim 1, wherein the user plane parameter is located in a body of the control message.

4. The method according to claim 3, wherein the user plane parameter is located in an information element.

5. The method according to claim 1, wherein the method comprises the additional step of providing a "Version not supported" message indicating to a peer node a type of user plane that is supported by the node.

6. The method according to claim 1, wherein a Tunnel Endpoint Identifier (TEID) parameter is interpreted as a TEID in case of a GTP-U user plane and, and wherein the TEID parameter is interpreted as a GRE key in case of a GRE based user plane.

7. The method according to claim 1, wherein user plane is selected on the basis of user equipment and wherein a packet data gateway network node (PGW-node) handles GTP-U user plane and GRE user plane when a user equipment connected to the PGW-node moves between non-3GPP and 3GPP access.

8. The method according to claim 1, wherein a packet data gateway network node (PGW-node) is dedicated for user equipment that does not have need for additional GTP-U features.

9. The method according to claim 8, wherein the user equipment are mobile broadband users.

10. A communication node in a telecommunications network arranged to provide a generic control plane, referred to as GPRS Tunneling Protocol-Control (GTP-C), the generic control plane being in a GPRS Tunneling Protocol (GTP) mobility protocol, the GTP-C supporting both a GPRS Tunneling Protocol-User (GTP-U) user plane and a Generic Routing Encapsulation (GRE) based user plane, when a type of user plane is detected, the type of user plane being a GTP-U user plane or a GRE based user plane, said node comprising:
   a memory;
   a processor arranged to execute instructions stored in the memory to provide a user plane parameter in a control plane message header of the generic control plane, wherein the user plane parameter indicates the type of user plane, and
   the processor being further arranged to provide functions, parameters and messages according to the indicated type of user plane through a communications interface to another node;
   wherein the generic control plane is configured to support both GTP-U and GRE based user planes;
   wherein the user plane parameter is located in a header of the control plane message; and
   wherein the user plane parameter is a user plane flag (UPF), wherein UPF=0 indicates the type of user plane is a GTP-U user plane and UPF=1 indicates the type of user plane is a GRE based user plane.

* * * * *